US008741150B2

(12) United States Patent
Chung et al.

(10) Patent No.: US 8,741,150 B2
(45) Date of Patent: Jun. 3, 2014

(54) LITHIUM RECOVERY DEVICE USING SEPARATOR RESERVOIR, LITHIUM RECOVERY METHOD AND LITHIUM ADSORPTION/DESORPTION SYSTEM USING THE SAME

(75) Inventors: Kang-Sup Chung, Daejeon (KR); Jae-Chun Lee, Daejeon (KR); Hwan Lee, Daejeon (KR)

(73) Assignee: Korea Institute of Geosciences and Mineral Resources, Daejon (KR)

( * ) Notice: Subject to any disclaimer, the term of this patent is extended or adjusted under 35 U.S.C. 154(b) by 576 days.

(21) Appl. No.: 13/121,558
(22) PCT Filed: Aug. 13, 2009
(86) PCT No.: PCT/KR2009/004541
§ 371 (c)(1),
(2), (4) Date: Mar. 29, 2011
(87) PCT Pub. No.: WO2010/035956
PCT Pub. Date: Apr. 1, 2010

(65) Prior Publication Data
US 2011/0174739 A1 Jul. 21, 2011

(30) Foreign Application Priority Data

Sep. 29, 2008 (KR) .................. 10-2008-0095493
Nov. 21, 2008 (KR) .................. 10-2008-0116204
Dec. 12, 2008 (KR) .................. 10-2008-0126534

(51) Int. Cl.
*B01J 39/00* (2006.01)
(52) U.S. Cl.
USPC ........... 210/663; 210/670; 210/675; 210/676; 210/677; 210/683; 210/688
(58) Field of Classification Search
USPC .................. 210/663, 670, 675–677, 683, 688
See application file for complete search history.

(56) References Cited

U.S. PATENT DOCUMENTS

| 3,791,520 | A * | 2/1974 | Nieuwenhuls ................ 210/679 |
| 7,258,328 | B2 * | 8/2007 | Lee .................. 261/97 |
| 2008/0119350 | A1 * | 5/2008 | Chung et al. .................. 502/4 |
| 2009/0090662 | A1 * | 4/2009 | Quinn ................ 210/88 |

FOREIGN PATENT DOCUMENTS

| JP | 59-183882 | 10/1984 |
| JP | 03-008439 | 1/1991 |

OTHER PUBLICATIONS

Steinberg et al., "Preliminary Design and Analysis of a Process for the Extraction of Lithium from Seawater," Brookhaven National Laboratory, Sep. 1975, re-published at http://upload.wikimedia.org/wikipedia/commons/d/d9/Preliminary_Design_And_Analysis_of_a_process_for_the_extraction_of_lithium_from_sewater.pdf.*
Umeno, A. et al., Preparation and Adsorptive Properties of Membrane-Type Adsorbents for Lithium Recovery from Seawater. Ind. Eng. Chem. Res. 2002, vol. 41, No. 17, pp. 4281-4287.*

* cited by examiner

*Primary Examiner* — Chester Barry
(74) *Attorney, Agent, or Firm* — Edwards Wildman Palmer LLP; Kongsik Kim

(57) ABSTRACT

The present invention relates to a lithium recovery device comprising a separator reservoir and manganese oxide, a lithium recovery method using the same, and a lithium adsorption/desorption system. The separator reservoir includes a vacant space therein and an outer wall made of a polymer or a membrane of other useful materials. The manganese oxide is contained, as an adsorbent, in the vacant space inside the separator reservoir. The lithium adsorption/desorption system enables lithium recovery through adsorption and desorption of lithium dissolved in seawater using a lithium adsorbent prepared with the manganese oxide in one system, wherein the manganese oxide can be used as a lithium adsorbent with high lithium selectivity. The invention uses a separator reservoir including an outer wall made of a porous polymer or a membrane of other useful materials. As a result, the invention can be directly applied to seawater by enabling free movement of the solution, especially seawater, without additional pressure from the outside. The invention ensures strong stability in seawater and the acidic solution using a polymer with high chemical resistance and mechanical strength, or other useful materials. Therefore, the invention can be widely used in technical fields requiring lithium recovery.

24 Claims, 9 Drawing Sheets

LITHIUM RECOVERY DEVICE USING SEPARATOR RESERVOIR, LITHIUM RECOVERY METHOD AND LITHIUM ADSORPTION/DESORPTION SYSTEM USING THE SAME

CROSS-REFERENCES TO RELATED APPLICATIONS

This application is a U.S. national phase application, pursuant to 35 U.S.C. §371, of PCT/KR2009/004541, filed Aug. 13, 2009, designating the United States, which claims priority to Korean Application No. 10-2008-0095493, filed Sep. 29, 2008, Korean Application No. 10-2008-0116204, filed Nov. 21, 2008, and Korean Application No. 10-2008-0126534, filed Dec. 12, 2008. The entire contents of the aforementioned patent applications are incorporated herein by this reference.

TECHNICAL FIELD

The present invention relates, in general, to a lithium recovery device using a separator reservoir, and a lithium recovery method and a lithium adsorption/desorption system using the same. Particularly, the present invention relates to a lithium recovery device including a separator reservoir composed of an outer wall, made from a polymer or other available material membrane, and a cavity surrounded by the outer wall, and a manganese oxide serving as a lithium adsorbent, contained in the cavity, a lithium recovery method using the lithium recovery device, and a lithium adsorption/desorption system with which lithium dissolved in the seawater is systematically recovered through adsorption and desorption using the lithium absorbent made of the manganese oxide that has high adsorption-selectivity with respect to lithium.

BACKGROUND ART

Recently, with rapid technical development in industries of mobile phones, notebooks, and electric automobiles, a worldwide demand for a portable energy source has been increasingly enlarged. Particularly, utilization of a lithium secondary battery as a portable energy source has been explosively increased. At present, lithium battery industry is actively developed in South Korea, Japan, and China, and with the increased demand for lithium batteries, the consumption of lithium for use in the lithium batteries practically increases. Further, lithium is also used as a material for producing tritium in thermonuclear fusion that is expected to be a next-generation energy source, the demand for lithium further increases.

It is estimated that the seawater contains about 230 billion tons of lithium ions, so that peoples now perceive it as an important lithium source. However, since the concentration of lithium in the seawater is very low as 0.17 mg/liter, when considering the economical feasibility for recovering lithium ions, a need exists to provide a system for selectively recovering lithium ions with low cost.

In order to recover lithium from a lithium-dissolved solution, particularly seawater, an ion exchange adsorption method, a solvent extraction method, a coprecipitation method, and the like haven been researched, and among the above methods, the ion exchange method is evaluated to be one of the most preferable lithium recovery methods because it uses manganese oxide-based inorganic adsorbent that provides an ion exchange characteristic of very high adsorption selectivity with respect to lithium, thereby efficiently recovering lithium ions. Accordingly, a variety of manganese oxide-based inorganic adsorbents are being developed (see Ind. Eng. Chem. Res., 40, 2054, 2001). The adsorption of lithium ions is carried out in such a way that upon topotactic extraction of lithium ions through acid treatment, lithium-manganese oxides having a spinel structure and acting as a precursor exhibit excellent adsorption selectivity with respect to lithium ions in an aqueous solution and thus have high functionality as a high-performance absorbent, so that the lithium ions in the solution are adsorbed with ion exchange between hydrogen ions and lithium ions, and then the lithium ions adsorbed on the inorganic adsorbent are recovered by further ion exchange between hydrogen ions and lithium ions. Thus, such a manganese oxide-based inorganic adsorbent has an advantage such as a repetitively reusable feature.

In case of applying a manganese oxide in the form of powders to a solution, particularly seawater, the manganese oxide powders should not be lost. To this end, according to Ind. Eng. Chem. Res., 41, 4281, 2002, a system is proposed in which a manganese oxide is also introduced when a separator membrane is manufactured using polyvinylchloride (PVC). However, this system has drawbacks in that a solution, particularly seawater should be supplied from exterior through additional addition of pressure, the amount of manganese oxide adsorbent introduced that is directly related to the recovery amount of lithium is limited, and a portion coated with PVC has a degraded adsorption performance.

Further, in the conventional process of processing a great quantity, e.g. more than tens of kg, or more than a ton of lithium-manganese oxide powders in the form of a particulate with the size of about 10 μm with an acidic solution to form manganese oxides, a bulky water bath and a stirring device efficiently promoting a reaction between the acidic solution and the powders are required, and separation and drying processes with respect to liquid obtained from the treatment with the acidic solution are further required. Like this, the conventional lithium ion recovery device and the lithium ion recovery method using the same are very complicated and troublesome device and method, and have to add careful attention to recovering processes.

DISCLOSURE

Technical Problem

Accordingly, the present invention has been made keeping in mind the above problems occurring in the related art, and is intended to provide a lithium recovery device including a separator reservoir composed of an outer wall, made from a polymer or other available material membrane, and a cavity surrounded by the outer wall, and a manganese oxide serving as a lithium adsorbent, contained in the cavity, a lithium recovery method using the lithium recovery device, and a lithium adsorption/desorption system with which lithium dissolved in the seawater is systematically recovered through adsorption and desorption using the lithium absorbent made of the manganese oxide that has high adsorption-selectivity with respect to lithium.

Technical Solution

It is a first aspect of the present invention is to provide a lithium recovery device including a separator reservoir having an outer wall made from a polymer or other material membrane and a cavity surrounded by the outer wall, and a manganese oxide serving as a lithium adsorbent, contained in the cavity of the separator reservoir.

It is a second aspect of the present invention is to provide a method of manufacturing a lithium recovery device, including (a) providing a separator reservoir having a cavity therein, using a polymer or other material membrane, and (b) filling the cavity of the separator reservoir with a manganese oxide serving as a lithium adsorbent.

It is a third aspect of the present invention is to provide a method of manufacturing a lithium recovery device, including (a) providing a separator reservoir having a cavity therein, using a polymer or other available material membrane, (b) filling the cavity of the separator reservoir with a lithium-manganese oxide, and (c) providing an acidic solution in the separator reservoir filled with the lithium-manganese oxide to extract lithium ions thereby to produce a manganese oxide serving as a lithium adsorbent.

It is a fourth aspect of the present invention is to provide a lithium recovery method including (a) introducing a lithium recovery device, including a separator reservoir having an outer wall made from a polymer or other material membrane and a cavity surrounded by the outer wall, and a manganese oxide serving as a lithium adsorbent, contained in the cavity of the separator reservoir, into a lithium-dissolved solution, (b) drawing the lithium recovery device out of the lithium-dissolved solution, and (c) immersing the lithium recovery device drawn out of the solution in an acidic solution to recover lithium.

It is a fifth aspect of the present invention is to provide a lithium recovery method including (a) filling a separator reservoir with a lithium-manganese oxide, (b) reacting the lithium-manganese oxide filled the separator reservoir with an acidic solution to extract lithium ions thereby to produce a manganese oxide serving as a lithium adsorbent, (c) supplying a seawater into the separator reservoir having therein the produced manganese oxide so as to allow lithium ions dissolved in the seawater to be adsorbed onto the manganese oxide, and (d) reacting the lithium ions-adsorbed manganese oxide provided in the separator reservoir with an acidic solution so as to desorb and recover the lithium ions from the manganese oxide.

It is a sixth aspect of the present invention is to provide a method of recycling a lithium adsorbent, including (a) homogeneously mixing a manganese oxide-based lithium adsorbent to be recycled and lithium compound in a desired composition ratio, (b) heat-treating the mixture to compound a lithium-manganese oxide precursor, and (c) acid-processing the compound lithium-manganese oxide precursor to extract lithium ions thereby to produce a manganese oxide-based lithium adsorbent.

It is a seventh aspect of the present invention is to provide a lithium adsorption/desorption system including a seawater supply source, a lithium adsorption/desorption device recovering lithium dissolved in a seawater by adsorption and desorption of lithium, a discharge unit discharging the seawater in which the adsorption and desorption of lithium were performed, and a controller controlling the lithium adsorption/desorption device.

It is an eighth aspect of the present invention is to provide a lithium adsorption/desorption system including a reaction section including a lithium-manganese oxide, allowing the lithium-manganese oxide to be reacted with an acidic solution to extract lithium ions thereby to produce a manganese oxide serving as an ion-sieve type lithium adsorbent, allowing the produced manganese oxide to be reacted with seawater so that the manganese oxide adsorbs lithium ions dissolved in the seawater, and allowing the lithium ions-adsorbed manganese oxide to be reacted with an acidic solution so that the lithium ions are desorbed from the manganese oxide, a recovery section supplying the acidic solution to the reaction section when the production of the manganese oxide and the desorption of the lithium ions are carried out in the reaction section, and supplying the seawater when the adsorption of the lithium ions dissolved in the seawater is carried out in the reaction section, and a discharge section discharging the seawater in which the lithium ions were adsorbed on the manganese oxide in the reaction section.

It is a ninth aspect of the present invention is to provide a method of recovering lithium in a lithium adsorption/desorption system, including (a) filling a reaction section with a lithium-manganese oxide, (b) allowing the lithium-manganese oxide filled the reaction section to be reacted with an acidic solution to extract lithium ions thereby to produce a manganese oxide serving as an ion-sieve type lithium adsorbent, (c) supplying a seawater to the reaction section in which the produced manganese oxide is contained, to allow lithium ions dissolved in the seawater to be adsorbed on the manganese oxide, and (d) allowing the lithium ions-adsorbed manganese oxide in the reaction section to be reacted with an acidic solution so as to desorb and recover the lithium ions.

Advantageous Effects

According to the present invention, the present invention has an advantage such as the manganese oxide being repetitively used to recover lithium with ion exchange between hydrogen and lithium. Further, since the separator reservoir has the polymeric outer wall with a porous structure, a solution, particularly, seawater, and a diluted acidic solution are free to move without exerting additional external pressure, so that the present invention can be advantageously directly adapted to the solution, particularly the seawater, and the diluted acidic solution.

Further, since the separator reservoir is made from a polymer or other material membrane that is chemically resistant and mechanically hard, it can be advantageously kept stable even in seawater or a diluted acidic solution. Thus, since the present invention can efficiently recover lithium with ease from seawater or a solution in which lithium is dissolved, the present invention is applicable to a variety of fields requiring the recovery of lithium.

Furthermore, according to the present invention, in a single device, without separate disconnection or disassembly process, the manganese oxide serving as a lithium adsorbent that is capable of adsorbing and recovering lithium with high selectivity is produced, and lithium ions dissolved in the seawater are recovered through adsorption and desorption of lithium using the lithium adsorbent. Thus, a great quantity of ion-sieve type manganese oxides can be produced in a simple, efficient manner, so that lithium can be recovered in a very quick, convenient, efficient manner.

BEST MODE

Figure 1:
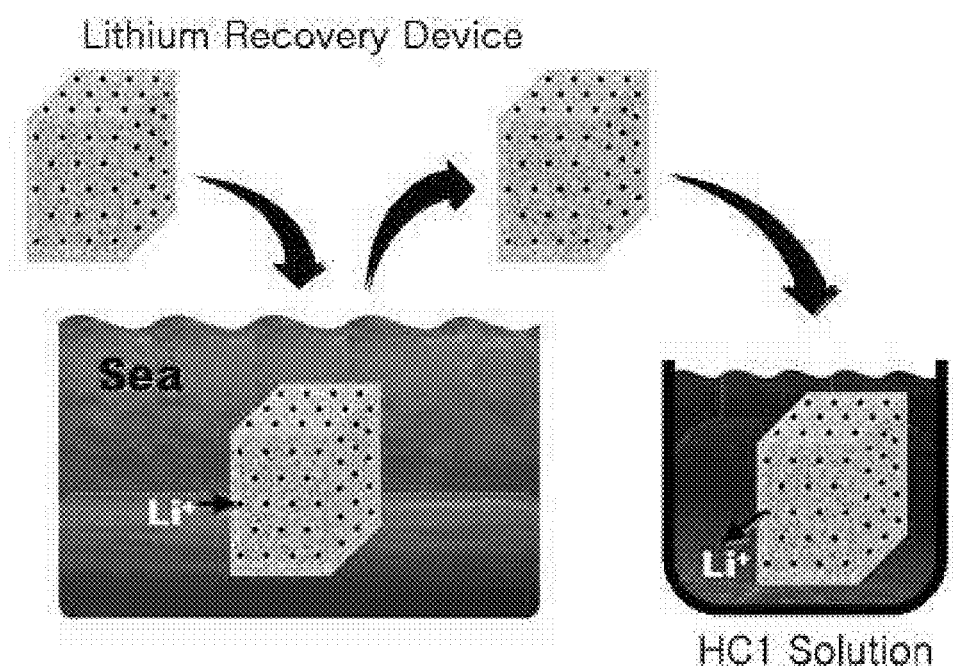
FIG. 1 is a schematic view showing a recovery process of lithium from seawater using a separator reservoir according to an embodiment of the present invention.

The above objects, features, and advantages of the present invention will be apparent by a following exemplary description with reference to the accompanying drawings. Hereinafter, detailed embodiments of the present invention will be described in detail with reference to the accompanying drawings.

A lithium recovery device according to the present invention is characterized in that it is an integrated device or system in which all processes of allowing the lithium-manganese oxide to be reacted with an acidic solution to extract lithium ions thereby to produce a manganese oxide serving as an ion-sieve type lithium adsorbent, allowing the produced manganese oxide to be reacted with seawater so that the manganese oxide adsorbs lithium ions dissolved in the seawater, and allowing the lithium ions-adsorbed manganese oxide to be reacted with an acidic solution so that the lithium ions are desorbed from the manganese oxide are carried out without separate disconnection or disassembly of the device or system.

The lithium-manganese oxide is a precursor for producing a manganese oxide that can be used as an ion-sieve type lithium adsorbent. The lithium manganese oxide is acid-processed, i.e. is reacted with an acidic solution to cause topotactic extraction of lithium ions, thereby producing an ion-sieve type manganese oxide. The produced ion-sieve type manganese oxide can be used as a high selectivity lithium adsorbent that is capable of adsorbing lithium through ion exchange.

The lithium-manganese oxide that is used in the present invention may preferably be a spinel structure ion-sieve type lithium-manganese oxide, particularly a lithium-manganese oxide having a spinel structure with a 3D tunnel structure, but it is not limited thereto.

As a preferable example of a lithium-manganese oxide, there may be $Li_nMn_{2-x}O_4$ (where $1 \leq n \leq 1.33$, $0 \leq x \leq 0.33$, and $n \leq 1+x$), most preferably $Li_{1.33}Mn_{1.67}O_4$. Another preferable example of a lithium-manganese oxide may be $Li_{1.6}Mn_{1.6}O_4$.

In the present invention, the lithium-manganese oxide may be a lithium-manganese oxide power compact that is formed by compacting lithium-manganese oxide powders, each being in the form of a particulate of about 10 μm. The forming method of the lithium-manganese oxide powder compact may be one or more methods selected from a group including a method of forming a honeycomb type compact through heat treatment of lithium-manganese oxide powers, a method of forming a compact through mixing of lithium-manganese oxide powers and binder and digestion of an urethane foaming agent, a method of forming a compact through filling an UF filter with lithium-manganese oxide powers, a method of forming a compact through filling a narrow fabric filter with lithium-manganese oxide powers, a method of forming a compact through filling a ceramic filter with lithium-manganese oxide powers, and a method of filling a separator reservoir with lithium-manganese oxide powers, but it is not limited thereto.

Like this, compared to the use of lithium-manganese oxide powers in the form of a particulate, the use of the lithium-manganese oxide power compact enables effective production of a great quantity of manganese oxides serving as an ion-sieve type lithium adsorbent when manufacturing an ion-sieve substance through an acid treatment.

An acidic solution that can be used in the acid treatment for manufacturing the ion-sieve substance may be any of acid solutions such as e.g. a hydrochloric acid solution. The acidic solution may preferably be a diluted acidic solution having a concentration of 0.1M to 1M. If a strong acidic solution having a concentration of above 1M is used, an amount of manganese ions extracted from the lithium-manganese oxide increases, possibly having an influence upon performance of an ion-sieve type adsorbent. Further, if an excessively diluted acidic solution having a concentration of below 0.1M is used, the production efficiency of manganese oxide serving as an ion-sieve type lithium adsorbent may be degraded.

The lithium recovery device includes a separator reservoir having an outer wall and a cavity surrounded by the outer wall, and a manganese oxide serving as a lithium adsorbent and contained in the cavity of the separator reservoir. Here, the separator reservoir (particularly the outer wall) may be made from a polymer or other available material membrane. While the separator reservoir may include an UF filter, a ceramic filter, or a narrow fabric filter, the present invention is not limited thereto. The separator reservoir (also referred to as a polymeric membrane reservoir) includes an outer wall made from a polymer or other available material membrane and a cavity surrounded by the outer wall.

The polymeric or other available material membrane and the outer wall formed by the membrane may preferably be of a porous structure, which enables a solution, particularly seawater, and a diluted acidic solution to flow in and out of the membrane and the outer wall without applying additional pressure from exterior, so that lithium can be easily recovered from a solution, particularly seawater in which lithium is dissolved only by directly introducing and drawing the lithium recovery device into and out of the solution or seawater.

The separator membrane may preferably be made of polymer or other available material that is chemically resistant to a solution, particularly seawater and a diluted acidic solution, and has excellent mechanical strength that is capable of maintaining pores to have a constant size. The separator membrane may be any of membranes, so long as it is insoluble in water and has excellent chemical resistance to acid, particularly weak acid and excellent mechanical strength maintaining the size of pores to be constant. The separator membrane may preferably be made of one or more substances selected from a group including polysulfone, polyester, polyethylene, polypropylene, polyvinylchloride, and blend and copolymer thereof, but it is not limited thereto.

The porous separator membrane may be manufactured with a known arbitrary method including, but not limited to, a phase inversion method, a salt leaching method, a non-woven fabric manufacturing method, or the like. The size of a pore of the porous separator membrane may preferably has, but not limited to, a range from 0.1 µm to 10 µm such that a solution, particularly seawater and a diluted acidic solution can freely flow through the membrane, but other foreign substances and manganese oxides cannot flow through the membrane. If the size of a pore exceeds 10 µm, undesired foreign substances may be introduced into the lithium recovery device of the invention, and the manganese oxides may be lost from the lithium recovery device. In addition, if the size of a pore is less than 0.1 µm, when the lithium recovery device is put into a solution, an inflow of water is difficult so that the pores are not effectively filled with water. This prolongs the flowing time of seawater and a diluted acidic solution and therefore the time of ion exchange (adsorption and desorption) of lithium, thereby possibly degrading the efficiency of the lithium recovery device. Further, the separator membrane may be configured to have a multi-layer structure by the combination of polymer or other available material membranes.

The manganese oxide produced as described before serves as a lithium adsorbent having high adsorption selectivity with respect to lithium, which is recovered through ion exchange between hydrogen and lithium, enabling easy, efficient recovery of lithium. The lithium recovery device using the lithium adsorbent can be advantageously repetitively reused. The principle of lithium recovery through ion exchange between hydrogen and lithium using the manganese oxide is known in the related art.

The manganese oxide may be any kinds of manganese oxides so long as it is able to perform selective ion exchange between lithium and hydrogen. The manganese oxide used in the present invention may preferably be a spinel structure ion-sieve type manganese oxide, particularly a manganese oxide having a spinel structure with 3D (1×3) tunnel structure. The manganese oxide may be, but not limited to, a manganese oxide of preferably $H_nMn_{2-x}O_4$ (where $1 \le n \le 1.33$, $0 \le x \le 0.33$, and $n \le 1+x$), and most preferably $H_{1.33}Mn_{1.67}O_4$. Another example of a manganese oxide having improved performance such as $H_{1.6}Mn_{1.6}O_4$ can also be applicable to the present invention.

The manganese oxide can be produced by the process of mixing a manganese compound and a lithium compound in a desired composition, heat-treating the mixture to cause solid phase reaction to occur, or treating the mixture with a gel method, thereby creating a lithium-manganese oxide as a precursor of a manganese oxide, and finally applying an acidic solution to the lithium-manganese oxide so as to substitute lithium with hydrogen. The solid phase reaction may preferably be performed in, but not limited to, an electric furnace.

The manganese compound may preferably be at least one selected from a group including manganese carbonate, manganese hydroxide, manganese oxide, and manganese acetate, and the lithium compound may preferably be at least one selected from a group including lithium carbonate, lithium hydroxide, lithium oxide, and lithium acetate. More preferably, the manganese compound and the lithium compound may be, but not limited to, $MnCO_3$ and $Li_2CO_3$, respectively.

The lithium recovery device of the present invention should have a sealed form configured such that a solution, particularly seawater and a diluted acidic solution flow through pores of the surface, and the manganese oxide and other foreign substances are prevented from passing through the surface.

In order to improve wettability, additionally, various attempts may be applicable to the lithium recovery device in such a manner that hydrophilic and oleophilic surfactants such as Aerosol-OT (a product manufactured by cytec, US) or Triton X-100 (a product manufactured by Union carbide, US) are introduced into the cavity of the separator reservoir, the separator reservoir is surface-modified for introduction of a hydrophilic radical into pores of the outer wall, the porous outer wall of the separator reservoir is formed in a nonwoven fabric form (see U.S. Pat. Nos. 5,165,979, 4,904,521, and 4,436,780), and so forth. When the wettability of the lithium recovery device is improved, it is easy for a solution, particularly seawater, and a diluted acidic solution to flow through the lithium recovery device, thereby efficiently recovering lithium using the lithium recovery device.

In the meantime, in an embodiment, a method of manufacturing a lithium recovery device includes (a) providing a separator reservoir having a cavity therein, using a polymer or other material membrane, and (b) filling the cavity of the separator reservoir with a manganese oxide serving as a lithium adsorbent. Here, the separator reservoir may include an UF filter, a ceramic filter, or a narrow fabric filter.

In another embodiment, a method of manufacturing a lithium recovery device, includes (a) providing a separator reservoir having a cavity therein, using a polymer or other available material membrane, (b) filling the cavity of the separator reservoir with a lithium-manganese oxide, and (c) providing an acidic solution in the separator reservoir filled with the lithium-manganese oxide to extract lithium ions thereby to produce a manganese oxide serving as a lithium adsorbent.

The manganese oxide and the lithium-manganese oxide that is a precursor of the manganese oxide are the same as those described before.

In addition, as described before, the acidic solution that can be used in the present invention may be, but not limited to, a hydrochloric acid solution. The acidic solution may preferably be, but not limited to, a diluted acidic solution having a concentration of 0.1M to 1M. If a strong acidic solution having a concentration of above 1M is used, an amount of manganese dissolved from the manganese oxide (inorganic adsorbent) increases, possibly having an influence upon performance of an adsorbent, or otherwise eroding the outer wall of the polymeric membrane reservoir.

In the present embodiment, the lithium recovery device may be manufactured in such a manner that a spherical or rectangular solid separator membrane having a cavity therein is formed using a polymer or other useful material membrane, a manganese oxide is placed in the cavity, and finally the opening of the separator membrane is sealed, but the manufacturing method is not limited thereto. The separator membrane made from the polymer or other useful material membrane may be of any shape, so long as it is provided so that a cavity is formed therein. The sealing of the separator membrane may be implemented with known arbitrary method including, but not limited to, a heat-fusion method, a method using an ethylenevinylalcohol-based heat-fusion adhesive, and a sewing method using an acid-resistant thread.

In another embodiment, the lithium recovery device may be manufactured in such a manner that a spherical or rectangular solid separator membrane having a cavity therein is formed using a polymer or other useful material membrane, a precursor of a manganese oxide is placed in the cavity, the opening of the separator membrane is sealed, and finally an acidic solution is applied thereto, but the manufacturing method is not limited thereto. The sealing method of the separator membrane is the same as that described above.

When the acidic solution is applied to the polymeric membrane reservoir filled with the precursor of the manganese oxide, lithium of the precursor of the manganese oxide is substituted with hydrogen to produce a manganese oxide, which can be used to recover lithium according to the present invention. The acidic solution is the same as that described before.

In the meantime, in an embodiment, a lithium recovery method include (a) introducing a lithium recovery device, including a separator reservoir having an outer wall made from a polymer or other material membrane and a cavity surrounded by the outer wall, and a manganese oxide serving as a lithium adsorbent, contained in the cavity of the separator reservoir, into a lithium-dissolved solution, (b) drawing the lithium recovery device out of the lithium-dissolved solution, and (c) immersing the lithium recovery device drawn out of the solution in an acidic solution to recover lithium.

In the step of introducing the lithium recovery device into the lithium-dissolved solution, the lithium recovery device may preferably be fixedly placed in the solution in order not to lose the lithium recovery device, and the lithium-dissolved solution may preferably be seawater, but the present invention is not limited thereto.

The step of drawing the lithium recovery device means simply taking the lithium recovery device, immersed in the solution, out of the solution, preferably after time elapse that ion exchange between hydrogen and lithium is sufficiently implemented.

When the drawn lithium recovery device is immersed in the acidic solution, ion exchange occurs between hydrogen ions of the acidic solution and lithium ions provided in the lithium recovery device so as to recover lithium. The principle of recovering lithium through ion exchange is the same as known in the related art. The acidic solution is the same as described before.

In another embodiment, a lithium recovery method includes (a) filling a separator reservoir made of polymer or other useful material with a lithium-manganese oxide, (b) reacting the lithium-manganese oxide filled the separator reservoir with an acidic solution to extract lithium ions thereby to produce a manganese oxide serving as a lithium adsorbent, (c) supplying a seawater into the separator reservoir having therein the produced manganese oxide so as to allow lithium ions dissolved in the seawater to be adsorbed onto the manganese oxide, and (d) reacting the lithium ions-adsorbed manganese oxide provided in the separator reservoir with an acidic solution so as to desorb and recover the lithium ions from the manganese oxide.

In step (d), lithium can be recovered by collecting the solution containing the desorbed lithium ions that are obtained by reacting the manganese oxide on which the lithium ions of the separator reservoir are adsorbed with the acidic solution, and concentrating the same.

In addition, in step (d), the lithium recovery can be more efficient by repeating a process of supplying and circulating, into the separator reservoir, the solution containing the desorbed lithium ions that are obtained by reacting the manganese oxide on which the lithium ions dissolved in the seawater are adsorbed with the acidic solution, thereby improving desorption efficiency of lithium.

The lithium recovery method of this embodiment may further include, after the step (b), collecting and recovering the solution containing the lithium ions extracted from the separator reservoir. Lithium can be recovered by concentrating the recovered solution containing the lithium ions.

In addition, the lithium recovery method of this embodiment may further include, after the step (c), discharging the seawater in which dissolved lithium ions have been adsorbed on the manganese oxide in the separator reservoir.

According to this embodiment, the production of the manganese oxide serving as an ion-sieve type lithium adsorbent and the lithium recovery through adsorption and desorption of lithium ions using the produced manganese oxide can be carried out in a through process without separate disconnection or disassembly. This is facilitated by controlling flow of the acidic solution, the seawater, the solution in which lithium ions are extracted or desorbed, or the like, which is used in reaction occurring in the lithium recovery device, so that lithium can be recovered quickly and efficiently.

In an embodiment, a method of recycling a lithium adsorbent, includes (a) homogeneously mixing a manganese oxide-based lithium adsorbent ($\lambda$-$MnO_2$) to be recycled and a lithium compound (e.g. lithium carbonate, lithium hydroxide, etc.) in a desired composition ratio, (b) heat-treating the mixture to compound a lithium-manganese oxide precursor, and (c) acid-processing the compound lithium-manganese oxide precursor to extract lithium ions thereby to produce a manganese oxide-based lithium adsorbent.

Here, since the performance of the ion-sieve type manganese oxide-based lithium adsorbent for recovering lithium dissolved in the seawater may be degraded during repetitive use due to the collapse of microstructure of the adsorbent, this method is intended to recycle the adsorbent for reuse. This method provides the spinel structure compound of lithium-manganese oxide powders and produces the ion exchange type lithium adsorbent. With this method, when the adsorption performance of the lithium adsorbent is degraded during repetitive adsorption and desorption of lithium ions dissolved in the seawater due to the collapse of microstructure of the lithium adsorbent, the degraded lithium adsorbent can be recycled into a new lithium adsorbent, thereby improving economical efficiency of extraction process for lithium dissolved in the seawater.

In an embodiment, a lithium adsorption/desorption system includes a seawater supply source, a lithium adsorption/desorption device recovering lithium dissolved in a seawater by adsorption and desorption of lithium, a discharge unit discharging the seawater in which the adsorption and desorption of lithium were performed, and a controller controlling the lithium adsorption/desorption device.

Figure 2:
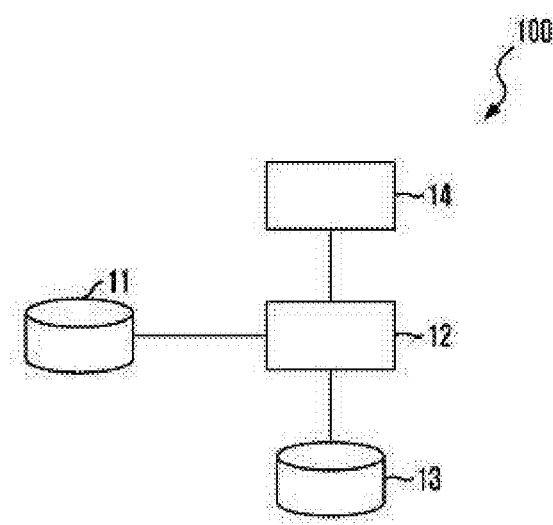
FIG. 2 is a schematic view showing a lithium adsorption and desorption system according to an embodiment of the present invention.
Figure 3:
FIG. 3 is a detailed conceptual diagram showing the lithium adsorption and desorption system shown in FIG. 2.

FIG. 2 is a schematic view showing the concept of a lithium adsorption and desorption system according to an embodiment of the present invention, and FIG. 3 is a detailed conceptual diagram showing the lithium adsorption and desorption system shown in FIG. 2.

Referring to FIGS. 2 and 3, the lithium adsorption and desorption system 100 includes a seawater supply source 11, a lithium adsorption/desorption device 12, a controller 13, and a discharge unit 14.

The lithium adsorption/desorption device 12 includes a lithium adsorption/desorption unit allowing a lithium recovery device, which includes a separator reservoir having an outer wall made from a polymer or other useful material membrane and a cavity surrounded by the outer wall, and a manganese oxide serving as a lithium adsorbent and provided in the cavity of the separator reservoir, to be reacted with the seawater supplied from the source to adsorb lithium dissolved in the seawater, and allowing the adsorbed lithium to be reacted with an acidic solution to desorb lithium, an acid supply unit supplying the acidic solution to the lithium adsorption/desorption unit, and a lithium recovery unit recovering lithium desorbed from the lithium adsorption/desorption unit.

Here, the lithium recovery device is the same as that described before, and the separator reservoir of the lithium recovery device may be made of polymer or other useful material, and include, but not limited to, an UF filter, a ceramic filter, or a narrow fabric filter. The lithium recovery device in the lithium adsorption/desorption unit may consist of multiple devices, and may be disposed in a bath of the lithium adsorption/desorption unit. Further, the lithium adsorption/desorption unit may also consist of multiple units.

The manganese oxide as the lithium adsorbent may be produced by filling the separator reservoir with the lithium-manganese oxide and reacting the lithium-manganese oxide filled the separator reservoir with the acidic solution to extract lithium ions, thereby producing the manganese oxide.

The seawater supply source 11 supplies the seawater to the lithium adsorption/desorption device 12, and the seawater may be the seawater that is directly supplied from the sea, or the seawater discharged from nuclear power plant or thermoelectric power plant after being used as cooling water. The acid supplying unit supplies the acidic solution to the lithium adsorption/desorption unit to allow the lithium recovery device to be reacted with the acidic solution in order to recover lithium.

The lithium adsorption/desorption device may be installed on land or sea, and the controller may be installed on land so as to remotely monitor or control the adsorption/desorption of lithium.

The lithium recovery unit recovers lithium desorbed by the lithium adsorption/desorption device 12, and the discharge unit 14 discharges the seawater in which the dissolved lithium ions have been adsorbed on the manganese oxide in the lithium adsorption/desorption device 12.

In addition, in order to implement the lithium recovery more effectively through improvement in extraction efficiency of lithium, selectively, the solution in which lithium ions are extracted and which is discharged after production of the ion-sieve type lithium adsorbent in the lithium adsorption/desorption device 12 may also be transferred to and recovered by the lithium recovery unit of the lithium adsorption/desorption device 12.

Like this, according to the present invention, the production of the manganese oxide serving as an ion-sieve type lithium adsorbent and the adsorption and desorption of lithium in the seawater using the lithium adsorbent can be effectively performed in a single system without separate disconnection and disassembly.

This lithium adsorption/desorption system 100 is an once-through type lithium adsorption/desorption system, and the lithium adsorption/desorption system and a reservoir thereof may be made of a material, preferably stainless steel, a chemical-resistant substance coated material, or polymer that has excellent chemical resistance with respect to the seawater and the acidic solution and excellent mechanical strength. Exemplary material may preferably be one or more materials selected from a group including polysulfone, polyethersulfone, polyethylene, polypropylene, polyvinylchloride, and blend and copolymer thereof. More preferably, the material may be polyvinylchloride.

However, other component such as e.g. a device of the system may be made of steel or stainless steel for maintaining a shape, strength, or the like.

Figure 4:
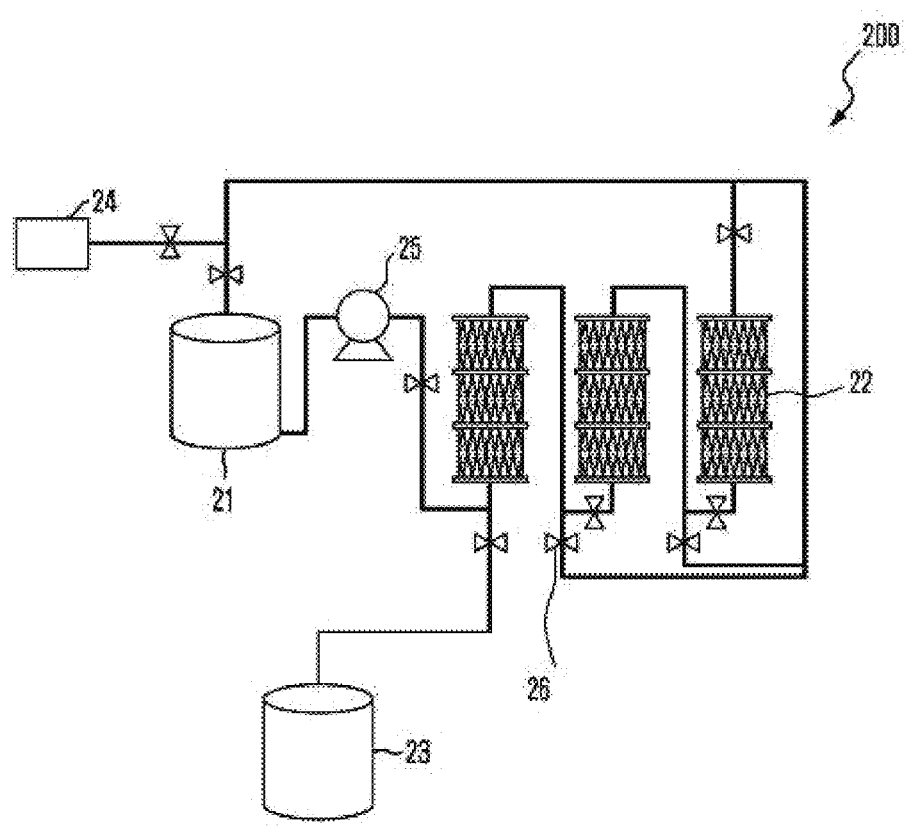
FIG. 4 is a further conceptual diagram showing a lithium adsorption and desorption system according to an embodiment of the present invention.
Figure 5:
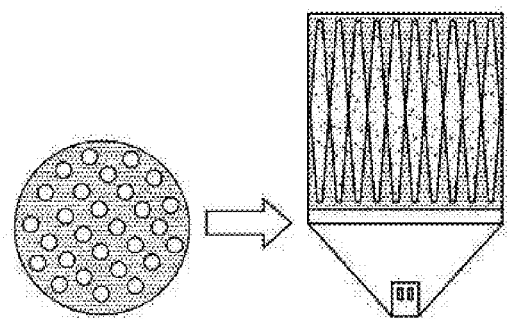
FIG. 5 is a schematic view showing a spray nozzle form of a lower portion of a multi-stage column that constitutes a reaction section of the lithium adsorption and desorption system shown in FIG. 4.

FIG. 4 is a further conceptual diagram showing a lithium adsorption and desorption system according to an embodiment of the present invention, and FIG. 5 is a schematic view showing a spray nozzle form of a lower portion of a multi-stage column that constitutes a reaction section of the lithium adsorption and desorption system shown in FIG. 4.

Referring to FIGS. 4 and 5, the lithium adsorption and desorption system 200 includes a supply section 21, a reaction section 22, a recovery section 23, a discharge section 24, a transfer pump 25, and a controller.

Specifically, the reaction section 22 includes a lithium-manganese oxide, and allows the lithium-manganese oxide to be reacted with an acidic solution to extract lithium ions thereby to produce a manganese oxide serving as an ion-sieve type lithium adsorbent and allows the produced manganese oxide to be reacted with seawater so that the manganese oxide adsorbs lithium ions dissolved in the seawater, and allows the lithium ion-adsorbed manganese oxide to be reacted with an acidic solution so that the lithium ions are desorbed from the manganese oxide.

The supply section 21 supplies the acidic solution or the seawater to the reaction section. That is the supply section supplies the acidic solution to the reaction section when the production of the manganese oxide and the desorption of the lithium ions are carried out in the reaction section 22, and supplies the seawater to the reaction section when the adsorption of the lithium ions dissolved in the seawater is carried out in the reaction section 22.

Further, the supply section 21 may also serve to store the acidic solution or the seawater supplied to the reaction section 22.

The recovery section 23 recovers lithium desorbed in the reaction section 22. Specifically, the recovery section 23 collects a solution containing desorbed lithium ions, which are obtained in the reaction section 22 by producing the manganese oxide serving as an ion-sieve type lithium adsorbent, allowing the produced manganese oxide to be reacted with seawater so as to adsorb lithium ions dissolved in the seawater, and allowing the lithium ion-adsorbed manganese oxide to be reacted with an acidic solution so as to desorb the adsorbed lithium ions, and concentrates the solution, thereby recovering lithium. The discharge section 24 discharges the seawater in which the lithium ions were adsorbed on the manganese oxide in the reaction section 22.

In addition, selectively, in order to implement the lithium recovery more effectively through improvement in extraction efficiency of lithium, the solution in which lithium ions are extracted and which is discharged after production of the ion-sieve type lithium adsorbent in the reaction section 22 may be continuously supplied to the reaction section 22 to cause a reaction in the reaction section through circulation, thereby improving extraction efficiency of lithium ions from the lithium-manganese oxide. When lithium ions are maximally extracted from the lithium-manganese oxide and the production of the ion-sieve type lithium adsorbent is completed, the repetitive reaction may be stopped and the solution containing the extracted lithium ions may be recovered in the recovery section 23. The recovered solution containing the extracted lithium ions may be recovered through concentration.

Similarly, the process in the reaction section 22 of adsorbing the lithium ions dissolved in the seawater and allowing the reaction with the acidic solution for desorption of lithium ions is repeated by circulating the solution discharged after the reaction with the acidic solution thereby to increase the desorption efficiency of lithium, consequently providing more efficient lithium recovery.

In the present embodiment, the transfer pump 25 may be installed between the supply section 21 and the reaction section 22 in order to initially operate the lithium adsorption/desorption system 200.

The controller controls the flow of a solution in the lithium adsorption/desorption system 200, and it may preferably be a valve, or the like. The controller 26 may be installed on a connection section between respective components so as to control the flow of the acidic solution and the seawater and therefore the flow of a solution, a result of the reaction in the reaction section 22.

That is, according to the present embodiment, the adsorption of lithium ions dissolved in the seawater can be obtained by producing, in the reaction section 22, the manganese oxide serving as an ion-sieve type lithium adsorbent, and supplying, with the operation of the controller 26, the seawater to the reaction section 22 without separate disconnection and disassembly in a single device to allow the produced manganese oxide to be brought into direct contact with the seawater. Further, the desorption and recovery of lithium can be obtained by adsorbing, in the reaction section 22, the lithium ions of the seawater with the manganese oxide, and supplying, with the operation of the controller 26, the acidic solution to the reaction section 22 without separate disconnection and disassembly in a single device to allow the adsorbed lithium ions to be desorbed.

Like this, according to this embodiment, lithium recovery can be implemented through the manufacture of the ion-sieve type lithium adsorbent in a single system without separate disconnection or disassembly and the adsorption and desorption of lithium dissolved in the seawater with the lithium adsorbent, using the controller 26 controlling the flow of the solution in the system.

In the above embodiment, the reaction section 22 is configured so that multi-stage columns are filled with the lithium-manganese oxide. The multi-stage columns consist of one or more columns, each being made of a material having excellent chemical resistance and mechanical resistance, such as one or more materials selected from a group including polypropylene, polyethylene, polysulfone, polyestersulfone, polyvinylchloride, and blend and copolymer thereof. More preferably, the column is made of polyvinylchloride (PVC) having very excellent chemical resistance and mechanical resistance so that the stability and durability of the system can be maintained even in seawater and an acidic solution.

The thickness of the material constituting the multi-stage column can be regulated according to an amount of a lithium-manganese oxide filling the column, an installation condition, or the like. For example, if the material is polyvinylchloride, the thickness is preferably 1 mm to 50 mm, more preferably 10 mm. Such material may be a transparent or opaque material that is selectively used according to the process state.

The number of stages of the multi-stage columns can be properly regulated according to an amount of a lithium-manganese oxide filling the column, an installation condition, or the like. A porous plate support is installed at a lower portion between the respective stages in order to optimize the flow of an acidic solution or seawater between the respective stages.

In addition, as shown in FIG. 5, the lower portion of the multi-stage columns to which an acidic solution or seawater is supplied from the supply section 21 may have the form of a spray nozzle.

Like this, according to the present embodiment, the reaction section is configured into multi-stage columns, the porous plate support is provided between the respective stages constituting the multi-stage column, and the lower portion of the multi-stage column is formed like a spray nozzle, thereby maximizing the flow, contact reaction, and diffusivity of the acidic solution or seawater.

In addition, one or more multi-stage columns may be provided, so that the adsorption and desorption of lithium ions can be effectively performed, thereby considerably improving the recovery efficiency of lithium.

In an embodiment, a method of recovering lithium in the lithium adsorption/desorption system 200 includes (a) filling a reaction section with a lithium-manganese oxide, (b) allowing the lithium-manganese oxide filled the reaction section to be reacted with an acidic solution to extract lithium ions thereby to produce a manganese oxide serving as an ion-sieve type lithium adsorbent, (c) supplying seawater to the reaction section in which the produced manganese oxide is contained, to allow lithium ions dissolved in the seawater to be adsorbed on the manganese oxide, and (d) allowing the lithium ions-adsorbed manganese oxide in the reaction section to be reacted with an acidic solution so as to desorb and recover the lithium ions.

In step (d), lithium can be recovered by collecting a solution containing desorbed lithium ions, which are obtained by allowing the lithium ion-adsorbed manganese oxide of the reaction section to be reacted with an acidic solution and concentrating the solution.

In the present embodiment, selectively, the solution in which lithium ions are extracted and which is discharged after production of the ion-sieve type lithium adsorbent in step (b) may be continuously supplied to the reaction section to cause a reaction in the reaction section through circulation, thereby improving extraction efficiency of lithium ions from the lithium-manganese oxide. When lithium ions are maximally extracted from the lithium-manganese oxide included in the reaction section and the production of the ion-sieve type lithium adsorbent is completed, the repetitive reaction may be stopped and the solution containing the extracted lithium ions may be recovered.

Similarly, in step (d), the process in the reaction section of adsorbing the lithium ions dissolved in the seawater and allowing the reaction with the acidic solution for desorption of lithium ions is repeated by circulating the solution discharged after the reaction with the acidic solution thereby to increase the desorption efficiency of lithium, consequently providing more efficient lithium recovery.

The lithium recovery method of this embodiment may further include, after the step (b), collecting and recovering the solution containing the lithium ions extracted from the reaction section. Lithium can be recovered by concentrating the recovered solution containing the lithium ions.

In addition, the lithium recovery method of this embodiment may further include, after the step (c), discharging the seawater in which dissolved lithium ions have been adsorbed on the manganese oxide in the reaction section.

Like this, according to this embodiment, the production of the manganese oxide serving as an ion-sieve type lithium adsorbent and the lithium recovery through adsorption and desorption of lithium ions using the produced manganese oxide can be carried out in a through process without separate disconnection or disassembly. This is facilitated by controlling flow of the acidic solution, the seawater, the solution in which lithium ions are extracted or desorbed, or the like, which is used in reaction occurring in the reaction section, so that lithium can be recovered quickly and efficiently.

A description will now be made of a difference between the separator reservoir of the lithium recovery device according to the present invention and a conventional PVC forming method.

The method of manufacturing a high performance ion-sieve type lithium adsorbent includes (a) producing a precursor of lithium-manganese oxide such as $Li_{1.33}Mn_{1.67}O_4$ or $Li_{1.6}Mn_{1.6}O_4$ (powder type having average particulate size of 10 μm), (b) forming a bulky lithium-manganese oxide powder compact (this is because the lithium-manganese oxide powder cannot be directly applied to the seawater), and (c) processing the formed lithium-manganese oxide precursor power compact with 0.5M HCl solution so as to extract lithium ions, thereby producing ion-sieve type manganese oxide powders with lithium ion holes formed therein, which serve as a adsorbent capable of selectively adsorbing lithium ions that are dissolved in a very small amount in the seawater.

However, in case of the forming step (b), according to the related art, the produced lithium-manganese oxide precursor powders are mixed with polyvinylchloride (PVC) and dimethyl formamide (DMF), the mixture is fused in a vessel through heat-treatment, and the fused mixture is forcedly dropped into a solution (water:ethanol=1:1) through a nozzle under the condition of applying pressurized nitrogen gas or the like, thereby obtaining granules having the size of 2 mm to 3 mm. Then, when the PVC is washed with a great quantity of water, the DMF contained in the PVC is dissolved to form micro holes, through which an acidic solution for extraction of lithium or the seawater with lithium ions dissolved therein can flow in and out.

The conventional PVC forming method has problems such as high manufacturing cost, a great quantity of environmentally harmful substances being discharged, and impossible recycling of an adsorbent. That is, the manufacturing process is complex, a great quantity of DMF wastes, an environmentally harmful substance, is produced in the manufacturing process, the original performance of a powder adsorbent is reduced by about 30% due to PVC cladding, and after the lifetime of powder adsorbent, all of PVC granules have to be disused.

However, the present invention employing the separator reservoir is a highest leveled, new concept, environmentally friendly adsorbent assembly technology that is capable of essentially solving the problems with the PVC forming method and realizing very high economical efficiency. Such a separator reservoir is formed like a tea bag so that adsorbent powders are contained therein and then the reservoir is sealed, thereby completing the forming process. Thus, the manufacturing process is very simple, an environmentally harmful substance is not created during manufacturing process, the original performance of the powder adsorbent is maintained above 99%, and even after the lifetime of the powder adsorbent, the adsorbent can be recycled and repetitively reused.

Figure 9:
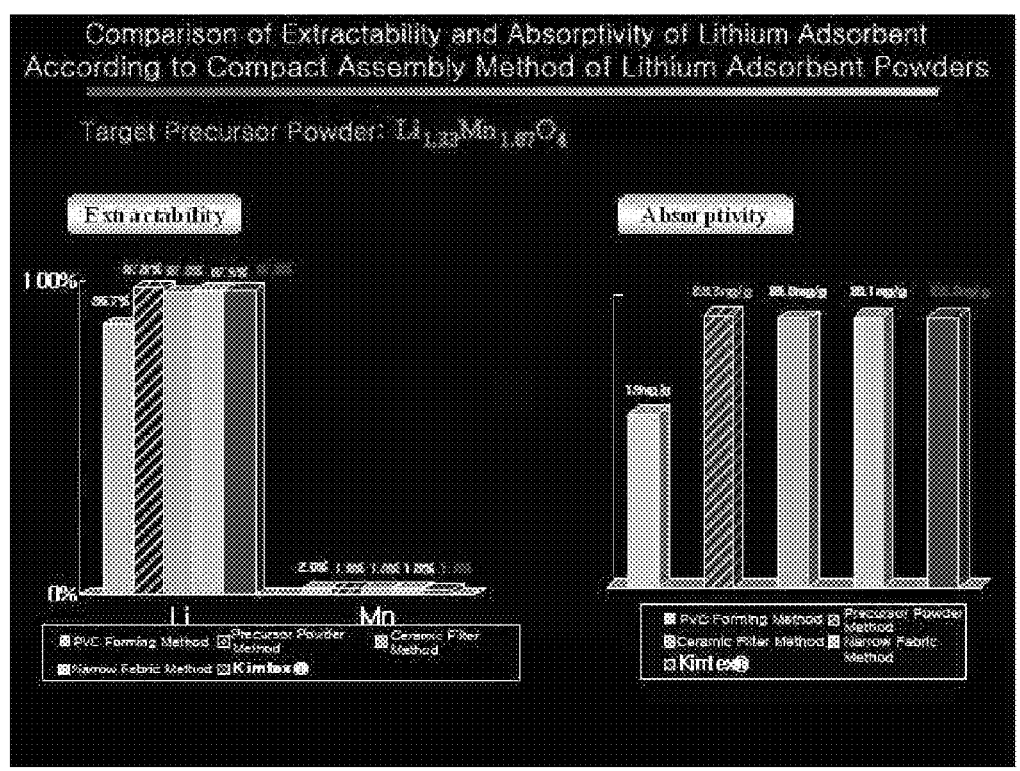
FIG. 9 shows graphs showing the results of extractability and absorptivity of lithium according to compacting assembly methods of lithium adsorbent powders of an embodiment of the present invention.

The above-mentioned content was described in FIG. 9 showing graphs indicating the results of extractability and absorptivity of lithium according to compacting assembly methods of lithium adsorbent powders.

EMBODIMENT

Hereinafter, preferred embodiments of the present invention will be described in detail. However, the following embodiments merely illustrate the present invention as examples, but not limiting the present invention.

Embodiment 1

Preparation of Lithium-Manganese Oxide and Manganese Oxide $Li_2CO_3$ and $MnCO_3$ were inserted into a stirrer with a mole ratio of 1.33:1.67 and mixed for 20 minutes. Then, the mixture was heat-treated in an electric furnace at a temperature of 500° C. for four hours to synthesize $Li_{1.33}Mn_{1.67}O_4$. Lithium of $Li_{1.33}Mn_{1.67}O_4$ was substituted with hydrogen using 0.5M HCl solution to prepare $H_{1.33}Mn_{1.67}O_4$ serving as a lithium adsorbent.

Embodiment 2

Manufacture of Lithium Recovery Device

Two sheets of KIMTEX manufactured by YUHAN-KIMVERLY Co., Ltd. were sealed at three edges using EVOH heat-fusion adhesive, $Li_{1.33}Mn_{1.67}O_4$ was inserted into the cavity in the sealed sheets, and finally the sheets were completely sealed at a remaining edge. The resultant product was immersed and maintained in 0.5M HCl solution for 24 hours, and an amount of lithium dissolved in the HCl solution was measured using an Inductively Coupled Plasma (ICP) spectroscopic analysis method. In this case, the amount of recovered lithium was 99% of the amount of introduced $Li_{1.33}Mn_{1.67}O_4$. Thereby, the lithium recovery device containing the manganese oxide $H_{1.33}Mn_{1.67}O_4$ for recovery of lithium was manufactured.

In order to check the infiltration capacity of the separator membrane of the manufactured lithium recovery device, the cumulative infiltration of mercury into the lithium recovery device over a pressure was measured using a mercury porosimeter so that a characteristic with respect to pores was evaluated. The measured results were shown in FIG. 4. From the results, it can be inferred that the seawater or HCl solution easily penetrates through the lithium recovery device of the present invention from 1 atm or less.

Embodiment 3

Manufacture of Lithium Adsorption/Desorption System

The lithium adsorption/desorption system was manufactured, which includes the supply section, the reaction section, the recovery section, the discharge section, the transfer pump, and the controller as described with reference to FIG. 4. The reaction section was formed like three coupled multi-stage columns, each composed of 300 (an outer diameter: OD)×200 (a length: L) three-stage flange type column using 10 mm thickness transparent polyvinylchloride (PVC). A porous plate support (Φ5 m/m) having a thickness of 10 mm or more was installed at a lower portion between respective stages. The lower portion of the column to which the seawater or the acidic solution is supplied from the supply section was formed like a spray nozzle form, and a valve was installed as a controller on a connection portion between respective components.

15 pieces therefore total 40.5 kg of lithium-manganese oxide manufactured in the embodiment 1 were filled in each stage of the multi-stage column.

Embodiment 4

Manufacture of Manganese Oxide as Ion-Sieve Type Lithium Adsorbent in Lithium Adsorption/Desorption System 0.5M HCl solution of 200 liters stored in the supply section of the lithium adsorption/desorption system of the abovementioned embodiment 3 was supplied to the reaction section at a flow rate of 2 liters/min using the transfer pump, and a solution (lithium ion-extracted solution) discharged after reacted in the reaction section was continuously supplied to the reaction section through circulation for 5 days. Accordingly, lithium ions were extracted from the lithium-manganese oxide of the reaction section, thereby manufacturing the manganese oxide $H_{1.33}Mn_{1.67}O_4$ serving as an ion-sieve type lithium ion adsorbent.

Here, the amount of lithium ions extracted in the HCl solution was measured using an atomic absorption spectrometer (AAS). As a result, the absorptivity of lithium ions and manganese ions was 99% or more and 1% or less, respectively. From the result, it can be seen that according to the lithium adsorption/desorption system, the manganese oxide as the ion-sieve type lithium adsorbent can be manufactured with high efficiency from the lithium-manganese oxide.

After the manganese oxide has been manufactured, the lithium ion-extracted solution discharged after being reacted in the reaction section was collected in and recovered by the recovery section through operation of the valve. Then, lithium was recovered by concentrating the recovered solution.

Embodiment 5

Adsorption of Lithium Ions Dissolved in Seawater in Lithium Adsorption/Desorption System Seawater was supplied at a rate of 2.88 tons/day for 30 days to the reaction section that contains the manganese oxide $H_{1.33}Mn_{1.67}O_4$ serving as an ion-sieve type lithium adsorbent of the lithium adsorption/desorption system that is manufactured according to the embodiment 4. Through the reaction with respect to the seawater, the lithium ions dissolved in the seawater were adsorbed by the ion-sieve type lithium adsorbent of the reaction section.

Embodiment 6

Desorption and Recovery of Adsorbed Lithium Ions in Lithium Adsorption/Desorption System After the adsorption of lithium ions has been completed with the process of the embodiment 5, 0.1M HCl solution of 200 liters stored in the supply section of the lithium recovery device was supplied to the reaction section at a flow rate of 2 liters/min using the transfer pump, and a solution discharged after being reacted in the reaction section was continuously supplied to the reaction section through circulation for 3 days. Accordingly, lithium ions adsorbed on the reaction section were desorbed. After completion of desorption reaction, the desorbed lithium ion-contained solution discharged after being reacted in the reaction section was collected in and recovered by the recovery section through operation of the valve. Then, lithium was recovered by concentrating the recovered solution.

Comparative Embodiment 1

Polysulfone was dissolved in N-methylpyrrolidone with a mass ratio of 15:85, the mixture was applied to a glass plate using a doctor blade, and the resultant was immersed in secondary pure water of 25 so as to manufacture a porous membrane with a phase inversion method. A reservoir containing therein 10 g $Li_{1.33}Mn_{1.67}O_4$ was manufactured with the same method as the embodiment 2, using the manufactured porous membrane. The resultant reservoir was immersed and maintained in 0.5M HCl solution for 24 hours, and an amount of lithium dissolved in the HCl solution was measured using ICP analysis. In this case, the amount of recovered lithium was 0.5% with respect to the amount of introduced $Li_{1.33}Mn_{1.67}O_4$.

Figure 6:
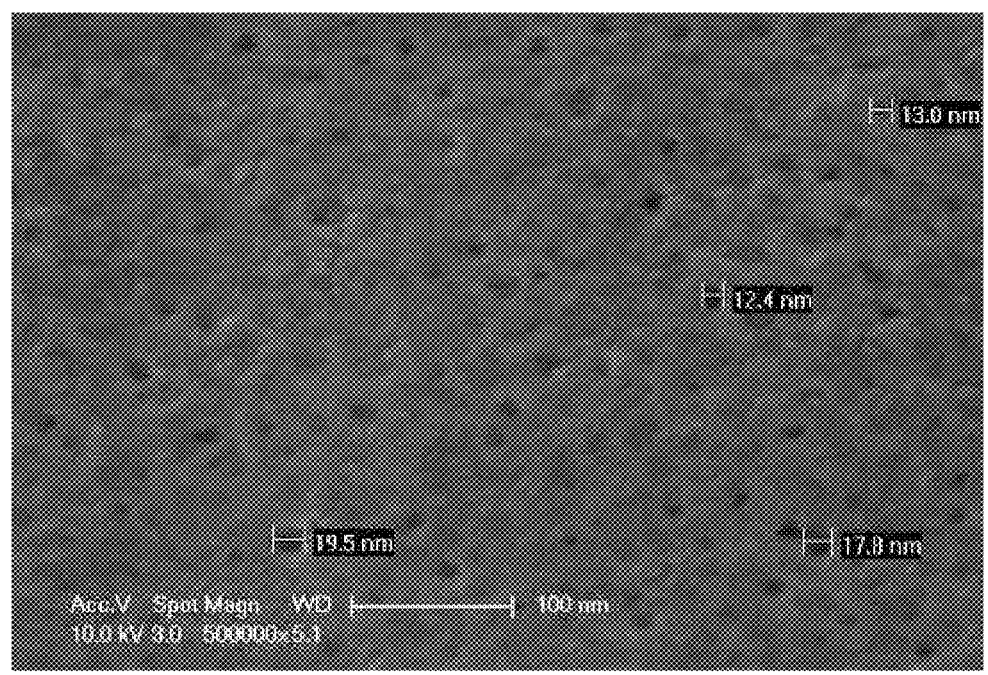
FIG. 6 is a SEM photograph showing the surface of a porous membrane of a comparative embodiment 1.

SEM photographs of the manufactured porous membrane were shown in FIG. 6. As shown in FIG. 6, as a result, it can be seen that when the porous membrane is immersed into a solution, flowing in and out of the solution through the porous membrane is somewhat difficult because of very small pore size of the porous membrane and hydrophobity of the polymeric membrane. Thus, it can be seen that if the pore size of the outer wall made of the polymeric membrane is too small, the efficiency of the lithium recovery device is degraded.

Comparative Embodiment 2

A reservoir containing therein 10 g $Li_{1.33}Mn_{1.67}O_4$ was manufactured with the same method as the embodiment 2, using a polyester-based nonwoven fabric (T030BC manufactured by Korea Nonwoven Fabric Tech, Co., Ltd.) of 1 mm thickness, and the resultant reservoir was immersed in 0.5M HCl solution. In this case, $Li_{1.33}Mn_{1.67}O_4$ introduced in the cavity or produced $H_{1.33}Mn_{1.67}O_4$ leaked, so that the reservoir could not serve as a reservoir.

Figure 7:
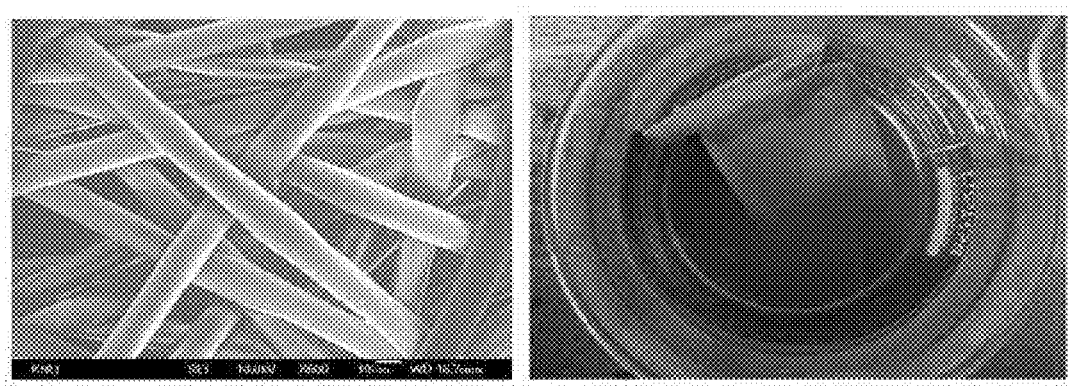
FIG. 7 shows a SEM photograph of a non-woven fabric structure used in a comparative embodiment 2, and a photograph showing leakage of $Li_{1.33}Mn_{1.67}O_4$ or $H_{1.33}Mn_{1.67}O_4$ from a polymer separator reservoir using the non-woven fabric structure.
Figure 8:
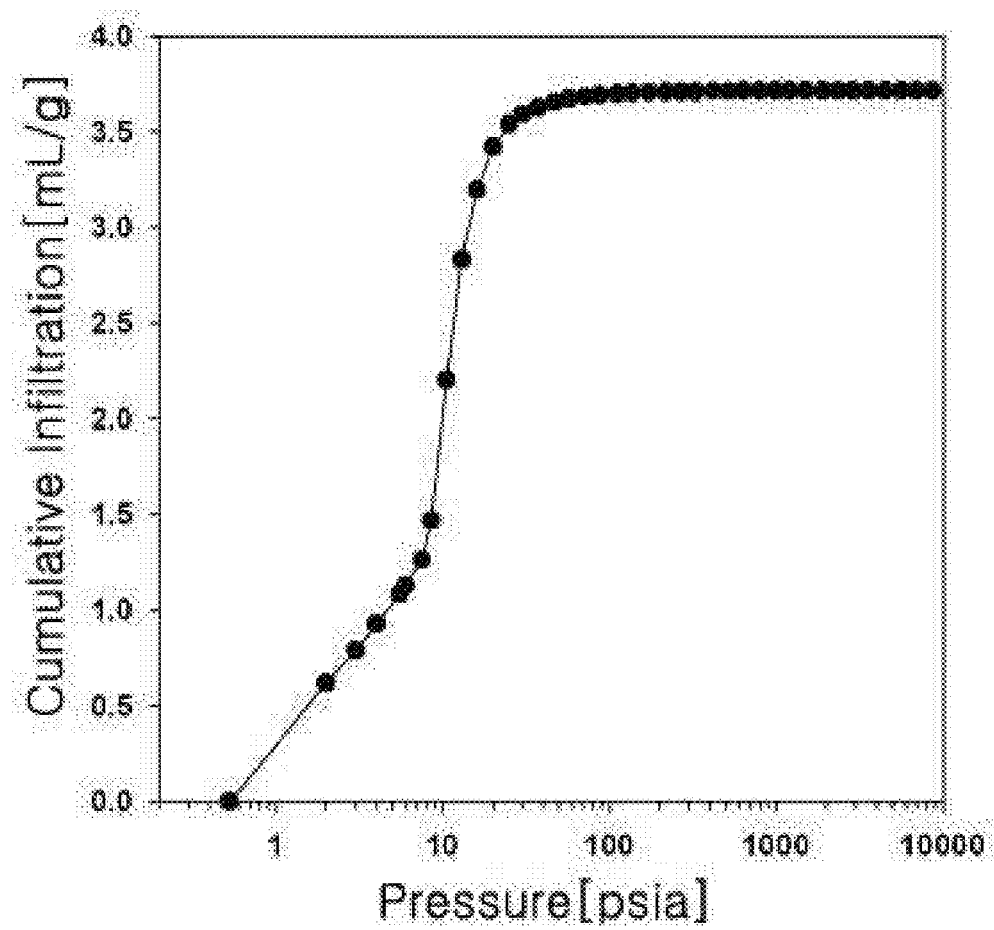
FIG. 8 is a graph showing the cumulative infiltration of mercury into a lithium recovery device of the comparative embodiment 2 over a pressure, which is measured by a mercury porosimeter.

FIG. 7 shows a SEM photograph of a nonwoven fabric structure and a photograph showing leakage of $Li_{1.33}Mn_{1.67}O_4$ or $H_{1.33}Mn_{1.67}O_4$ from the separator reservoir using the nonwoven fabric structure. From the foregoing, it can be seen that if the pore size of the outer wall made from the polymer or other useful material membrane is larger than the manganese oxide and the precursor thereof, the lithium recovery device cannot exert its original function.

TABLE 1

| | Porosity (%) | Lithium Recovery Rate (%) | Absorptivity of Porous Membrane after 6 hours (%) |
|---|---|---|---|
| Embodiment 2 | 77.4 | 99 | 100 or more |
| Comparative Embodiment 1 | 79 | 0.5 | 10 to 16 |

The absorptivity of a porous membrane=(wet weight of the porous membrane−dried weight of the porous membrane)/dried porous membrane×100.

The present invention is not limited to the above-mentioned embodiments and accompanying drawings, but it will be apparent to those skilled in the art that a variety of substitutions, modifications, and changes may be possible without departing from the scope and spirit of the invention as disclosed in the accompanying claims.

INDUSTRIAL APPLICABILITY

The present invention is applicable to the field of selectively and repetitively adsorbing and extracting lithium ions from seawater or the like.

The invention claimed is:

1. A lithium adsorption and desorption system comprising:
a reaction section including a sealed separator reservoir having an outer wall with a porous structure and a cavity surrounded by the outer wall, and a lithium-manganese oxide formed into a lithium-manganese oxide powder compact, which is provided in the cavity of the separator reservoir, wherein the outer wall has the size of a pore of 0.1 μm to 10 μm and has chemical resistance and mechanical strength, and wherein the reaction section performs steps of allowing the lithium-manganese oxide to be reacted with an acidic solution to extract lithium ions, thereby producing a manganese oxide serving as an ion-sieve type lithium adsorbent, and of allowing the produced manganese oxide to be reacted with seawater to adsorb lithium ions dissolved in the seawater, and then allowing the lithium ions-adsorbed manganese oxide to be reacted with an acidic solution to desorb the adsorbed lithium ions;

a supply section supplying the acidic solution to the reaction section when the production of the manganese oxide and the desorption of the lithium ions are carried out in the reaction section, and supplying the seawater to the reaction section when the adsorption of the lithium ions dissolved in the seawater is carried out in the reaction section;

a recovery section recovering the lithium adsorbed in the reaction section;

a discharge section discharging the seawater in which the lithium ions were adsorbed on the manganese oxide in the reaction section; and a controller controlling the flow of a solution between the reaction section, the supply section, the recovery section and the discharge section.

2. The lithium adsorption and desorption system of claim 1, wherein the reaction section is installed on land or sea.

3. The lithium adsorption and desorption system of claim 1, wherein the seawater is the seawater that is directly supplied from the sea, or the seawater supplied from the sea and discharged from a nuclear power plant or a thermoelectric power plant after being used as cooling water.

4. The lithium adsorption and desorption system of claim 1, wherein and the controller is installed on land so as to remotely monitor or control the adsorption/desorption of lithium.

5. The lithium adsorption and desorption system of claim 1, wherein the reaction section comprises one or more sections.

6. The lithium adsorption and desorption system of claim 1, wherein the separator reservoir is made of a polymer or other useful material, and wherein the outer wall is made from a polymer or other useful material membrane, and wherein a hydrophilic radical is introduced into the outer wall.

7. The lithium adsorption and desorption system of claim 1, wherein the lithium-manganese oxide is $Li_nMn_{2-x}O_4$ (where $1 \le n \le 1.33$, $0 \le x \le 0.33$, and $n \le 1+x$) or $Li_{1.6}Mn_{1.6}O_4$, the manganese oxide is $H_nMn_{2-x}O_4$ (where $1 \le n \le 1.33$, $0 \le x \le 0.33$, and $n \le 1+x$) or $H_{1.6}Mn_{1.6}O_4$.

8. The lithium adsorption and desorption system of claim 6, wherein the separator reservoir comprises any one of an UF filter, a ceramic filter, and a narrow fabric filter, and wherein the polymer is one or more materials selected from a group including polypropylene, polyethylene, polysulfone, polyester, polyethersulfone, polyvinylchloride, and blend and copolymer thereof.

9. The lithium adsorption and desorption system of claim 1, wherein the outer wall is formed into a multi-stage nonwoven fabric form, and hydrophilic and oleophilic surfactants are further provided in the cavity of the separator reservoir.

10. The lithium adsorption and desorption system of claim 1, wherein the acidic solution has the concentration of 0.1M to 1.0M.

11. The lithium adsorption and desorption system of claim 1, wherein the controller is one or more valves.

12. The lithium adsorption and desorption system of claim 1, further comprising a transfer pump between the supply section and the reaction section.

13. The lithium adsorption and desorption system of claim 1, wherein the reaction section comprises one or more multi-stage columns filed with a lithium-manganese oxide, the columns each having a plurality of stages, and wherein a porous plate support is installed at a lower portion of the respective stages.

14. The lithium adsorption and desorption system of claim 13, wherein the lower portion of the multi-stage column to which the acidic solution or the seawater is supplied from the supply section is formed into a spray nozzle form.

15. The lithium adsorption and desorption system of claim 1, wherein the recovery section receives lithium by collecting the solution containing the lithium ions desorbed in the reaction section, and concentrating the solution.

16. The lithium adsorption and desorption system of claim 1, wherein the supply section has a further function of storing the acidic solution or the seawater supplied to the reaction section.

17. A method of recovering lithium in a lithium adsorption/desorption system, comprising:

(a) filling a cavity of a separator reservoir with a lithium-manganese oxide formed into a lithium-manganese oxide powder compact, and sealing the separator reservoir, wherein the separator reservoir has an outer wall with a porous structure and the cavity surrounded by the outer wall, and the outer wall has the size of a pore of 0.1 μm to 10 μm and chemical resistance and mechanical strength;

(b) in a reaction section, allowing the lithium-manganese oxide to be reacted with an acidic solution to extract lithium ions, thereby producing a manganese oxide serving as an ion-sieve type lithium adsorbent;

(c) supplying seawater to the reaction section in which the produced manganese oxide is contained, to allow lithium ions dissolved in the seawater to be adsorbed on the manganese oxide; and (d) allowing the lithium ions-adsorbed manganese oxide in the reaction section to be reacted with an acidic solution so as to desorb and recover lithium.

18. The method of claim 17, wherein the step (d) comprises collecting the solution containing the desorbed lithium ions obtained by allowing the manganese oxide, on which the lithium ions of the reaction section are adsorbed, to be reacted with the acidic solution, and concentrating the solution and recovering lithium.

19. The method of claim 17, wherein the step (b) comprises continuously supplying, to the reaction section, the solution containing the extracted lithium ions and discharged after being reacted, to cause a repetitive reaction of the solution in the reaction section to occur, through circulation of the solution.

20. The method of claim 17 further comprising, after the step (b), collecting and recovering the solution containing lithium ions extracted in the reaction section.

21. The method of claim 17, wherein the step (d) comprises continuously supplying, to the reaction section, the discharged solution containing the desorbed lithium ions to cause the repetitive reaction of the solution in the reaction section to occur through circulation of the solution.

22. The method of claim 17 further comprising, after the step (c), discharging the seawater in which the adsorption of dissolved lithium ions were performed by the manganese oxide in the reaction section.

23. The lithium adsorption and desorption system of claim 1, the seawater and the acidic solution flow only through the pore.

24. The lithium adsorption and desorption system of claim 1, wherein the lithium-manganese oxide powder compact is chemically resistant to the seawater and the acidic solution and has mechanical strength sufficient to maintain the pores.

* * * * *